United States Patent
Tsai

(10) Patent No.: US 11,926,416 B1
(45) Date of Patent: Mar. 12, 2024

(54) FLIGHT CONTROL SYSTEMS AND RELATED METHODS OF MAGNETICALLY COUNTERACTING AERODYNAMIC LIFT FORCES ON FLIGHT CONTROL SURFACES

(71) Applicant: The Boeing Company, Chicago, IL (US)

(72) Inventor: Kevin Raylin Tsai, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/891,013

(22) Filed: Aug. 18, 2022

(51) Int. Cl.
*B64C 9/20* (2006.01)
*B64C 13/24* (2006.01)
*B64C 9/14* (2006.01)

(52) U.S. Cl.
CPC ............ *B64C 9/20* (2013.01); *B64C 13/24* (2013.01); *B64C 2009/143* (2013.01)

(58) Field of Classification Search
CPC ...... B64C 9/20; B64C 13/24; B64C 2009/143
See application file for complete search history.

(56) References Cited

U.S. PATENT DOCUMENTS

| | | | |
|---|---|---|---|
| 5,454,619 A * | 10/1995 | Haraway, Jr. | B62D 37/02 296/180.1 |
| 5,570,859 A | 11/1996 | Quandt | |
| 6,981,676 B2 | 1/2006 | Milliere | |
| 8,864,083 B1 | 10/2014 | Shmilovich et al. | |
| 9,242,718 B2 | 1/2016 | Wilson et al. | |
| 9,944,356 B1 | 4/2018 | Wigley | |
| 10,017,239 B2 * | 7/2018 | Neal | B64C 9/02 |
| 11,230,331 B2 | 1/2022 | Vanga | |
| 2016/0229526 A1 * | 8/2016 | Hegenbart | B64C 9/02 |
| 2020/0079493 A1 * | 3/2020 | Bensmann | B64C 9/14 |

FOREIGN PATENT DOCUMENTS

| | | |
|---|---|---|
| AT | 2473 U1 | 11/1998 |
| EP | 2513475 B1 | 2/2020 |

OTHER PUBLICATIONS

English machine-translation of AT2473U1; downloaded from Google Patents Aug. 18, 2022.
RC Universe.com: "Spoilers for Sig Riser 100" forum discussion; https://www.rcuniverse.com/forum/rc-gliders-sailplanes-slope-soaring-112/743922-spoilers-sig-riser-100-a.html, posted May 4, 2003.

* cited by examiner

*Primary Examiner* — Richard G Davis
(74) *Attorney, Agent, or Firm* — Kolitch Romano Dascenzo Gates LLC

(57) ABSTRACT

Methods comprise flying an aircraft at cruise which results in an aerodynamic lift force on a flight control surface of the aircraft that urges the flight control surface away from a stowed position. Concurrently with the flying, the methods include counteracting the aerodynamic lift force with a magnetic force that urges the flight control surface towards the stowed position and that results in the flight control surface being maintained in the stowed position during the flying. Flight control systems comprise a flight control surface and an adjacent structure. The flight control surface or the adjacent structure comprises a magnet and the other of the flight control surface or the adjacent structure comprises a ferromagnetic structure. A magnetic force urges the flight control surface toward a stowed position.

22 Claims, 5 Drawing Sheets

FLIGHT CONTROL SYSTEMS AND RELATED METHODS OF MAGNETICALLY COUNTERACTING AERODYNAMIC LIFT FORCES ON FLIGHT CONTROL SURFACES

FIELD

The present disclosure relates to flight control systems and related methods of magnetically counteracting aerodynamic lift forces on flight control surfaces.

BACKGROUND

Most aircraft include flight control surfaces that are utilized to maneuver the aircraft by adjusting the flight dynamics of the aircraft. Flight control surfaces typically operate by redirecting an incident airstream. Aircraft also typically include one or more actuators for controlling the deflection of a flight control surface relative to a neutral or stowed position, as the degree of deflection from the neutral position often determines the extent to which the flight control surface augments the incident airstream. Often, a flight control surface will impose minimal drag on the aircraft in its neutral or stowed position. For this reason, many flight control surfaces are maintained in neutral or stowed positions when an aircraft is piloted in cruise. For certain flight control surfaces, such as spoilers, the incident airstream produces an aerodynamic lift force on the flight control surface that urges it away from the neutral position. If this aerodynamic lift force is not countered, it will cause the flight control surface to move towards a deflected position in which the flight control surface produces increased drag on the aircraft. Typically, the one or more actuators that actuate the flight control surface between its neutral and deployed positions are used to counter the aerodynamic lift force and maintain the flight control surface in the neutral or stowed position. However, because the aerodynamic lift force may be relatively constant during cruise, continuous use of an actuator to offset the aerodynamic lift force can be fatiguing on its components and result in sub-optimal performance. This is particularly true for hydraulic actuators. Historically, for many flight control surface applications, non-hydraulic actuators are used to avoid this issue, and when hydraulic actuators are used, linear hydraulic actuators are used. Rotary hydraulic actuators are particularly susceptible to fatigue and high maintenance requirements, and thus historically are not used in connection with flight control surfaces.

SUMMARY

Methods of counteracting aerodynamic lift forces comprise flying an aircraft at cruise which results in an aerodynamic lift force on a flight control surface of the aircraft that urges the flight control surface away from a stowed position. Concurrently with the flying, the methods comprise counteracting the aerodynamic lift force with a magnetic force that urges the flight control surface towards the stowed position and that results in the flight control surface being maintained in the stowed position during the flying the aircraft at cruise.

Flight control systems comprise a flight control surface and an adjacent structure that is adjacent to the flight control surface. One of the flight control surface or the adjacent structure comprises at least one magnet and the other of the flight control surface or the adjacent structure comprises at least one ferromagnetic structure. An interaction of a magnetic field of the at least one magnet with the at least one ferromagnetic structure causes a magnetic force that urges the flight control surface toward a stowed position.

DESCRIPTION

Figure 1:
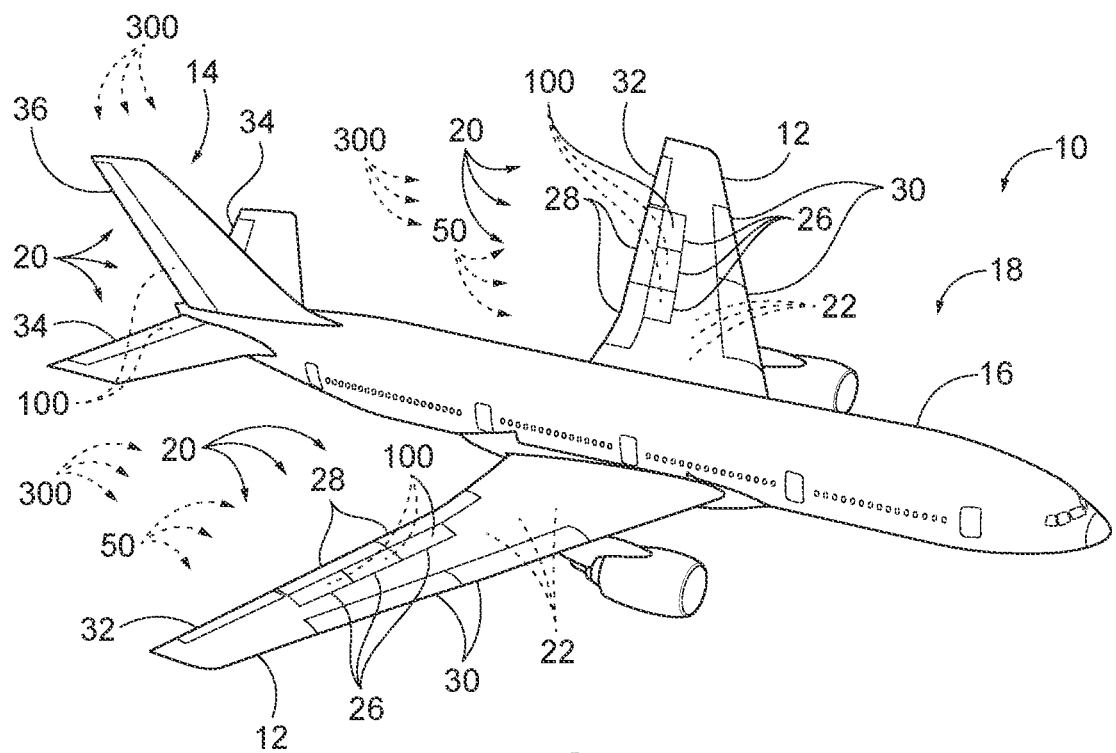
FIG. 1 is a perspective view showing examples of aircraft comprising flight control systems according to the present disclosure.

FIGS. 1-6 provide examples of aircraft 10, methods 200, flight control systems 300 comprising magnetic hold down assemblies 100, and flight control surfaces 20 according to the present disclosure. Elements that serve a similar, or at least substantially similar, purpose are labelled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure.

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

FIG. 1 is a schematic representation of an aircraft 10 that comprises one or more flight control systems 300 with magnetic hold down assemblies 100 according to the present disclosure. While aircraft 10 is depicted as a fixed-wing airliner, aircraft 10, flight control systems 300, and magnetic hold down assemblies 100 are not limited to such examples, and aircraft 10 may be any fixed wing aircraft, commercial aircraft, military aircraft, passenger aircraft, autonomous aircraft, rotorcraft, etc. Aircraft 10 typically includes wings 12 and a tail 14 that are supported by a fuselage 16 to form and/or define an airframe 18. The wings 12 and the tail 14 include a plurality of flight control surfaces 20 that are configured to be selectively moved relative to support structures 22 of the wings 12 or the tail 14. Examples of flight control surfaces 20 of wings 12 include spoilers 26, flaps 28, slats 30, and ailerons 32. Examples of flight control surfaces 20 of tail 14 include elevators 34 and rudders 36. Examples of support structures 22 include spars, ribs, or other underlying framework of a wing 12 or a tail 14.

The flight control surfaces 20 are adapted, configured, sized, shaped, and/or designed to be selectively moved relative to a support structure 22 and actuated between a stowed position and a deployed position. The stowed position also may be described as a retracted configuration, and the deployed position also may be described as an extended configuration. Actuation of the flight control surfaces 20 changes one or more aerodynamic characteristics of the aircraft 10 in a desired manner. Actuation of the flight control surfaces 20 may be facilitated, controlled, and/or regulated by one or more actuators 50 that are supported by, or otherwise coupled to, the support structures 22.

Flight control systems 300 comprise one or more magnetic hold down assemblies 100, each being associated with a respective flight control surface 20. Specifically, during flight, any given flight control surface 20 may be selectively maintained in its stowed configuration and may experience aerodynamic lift forces that urge the flight control surface 20 away from the stowed position and towards the deployed position. Herein, "urge" refers to the direction or application of a force and does not necessarily require actual movement of the element to which the term urge is applied. A spoiler 26 is an example of a flight control surface 20 that experiences such an aerodynamic lift force during flight. Each magnetic hold down assembly 100 may be configured to retain the respective flight control surface 20 in its stowed position, or urge the flight control surface 20 towards its stowed position as discussed in more detail herein. Thus, in some examples, aircraft 10 comprises at least one, and optionally a plurality of, magnetic hold down assemblies 100 that are configured to urge the flight control surfaces 20 towards their respective stowed positions. In some such examples, the aircraft 10 comprises at least one, and optionally a plurality of, the magnetic hold down assemblies 100 that are configured to urge the spoilers 26 towards their respective stowed positions.

Figure 2:
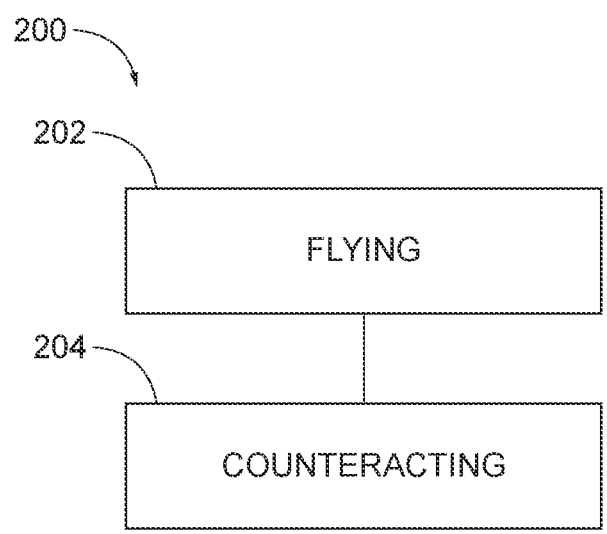
FIG. 2 is a flowchart schematically representing examples of methods according to the present disclosure.
Figure 3:
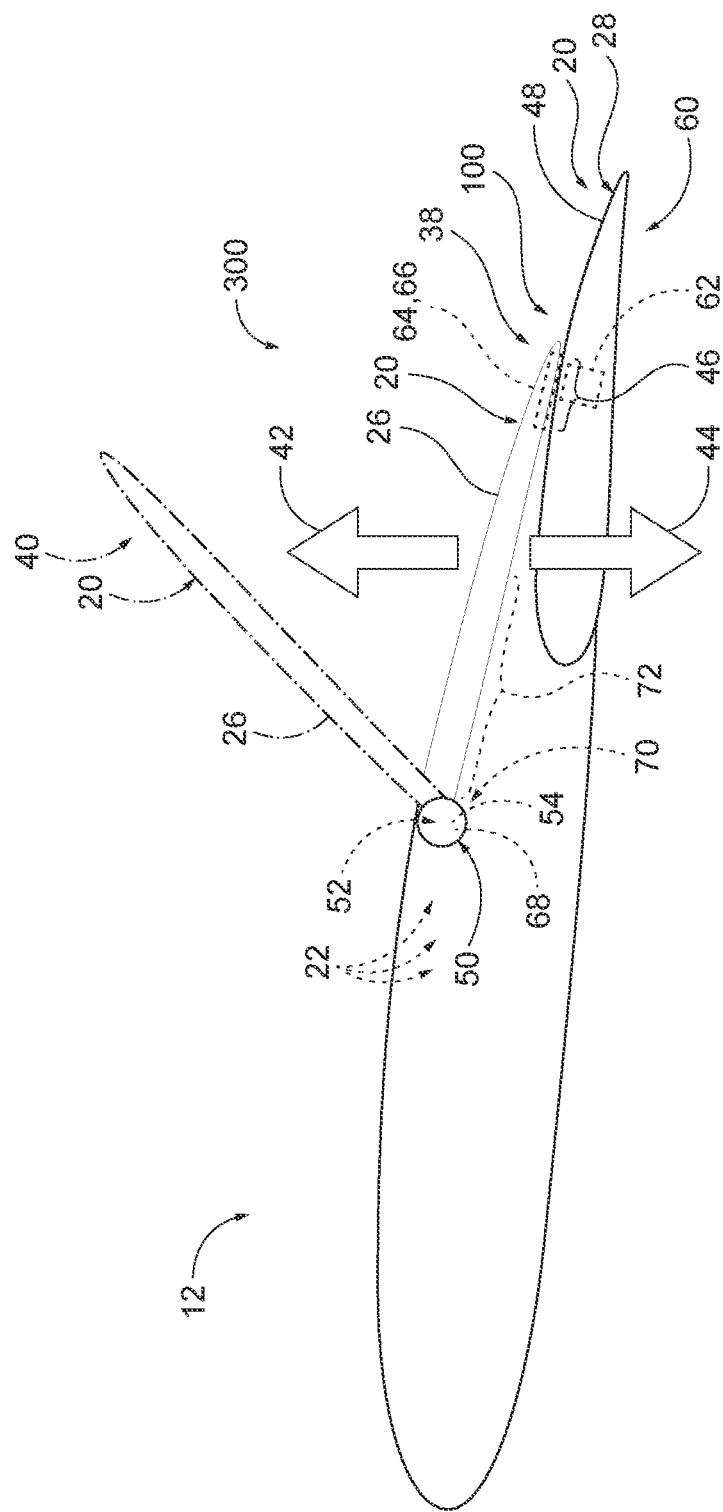
FIG. 3 is a cross-sectional view schematically representing wings comprising flight control systems according to the present disclosure.

FIG. 2 is a flowchart schematically representing methods 200 according to the present disclosure. FIG. 3 is a schematic cross-sectional view of a wing 12 that may be utilized in methods 200; however, methods 200 are not limited to flight control systems 300 embodied in a wing 12. As shown in FIG. 3, the wing 12 includes a flight control surface 20 and an adjacent structure 60 adjacent to the flight control surface 20. The wing 12 further comprises a magnetic hold down assembly 100 that includes at least one ferromagnetic structure 64 and at least one magnet 62. One of the flight control surface 20 or the adjacent structure 60 comprises the at least one magnet 62 and the other of the flight control surface 20 or the adjacent structure 60 comprises the at least one ferromagnetic structure 64. The at least one magnet 62 produces a magnetic field, and interaction of the magnetic field of the at least one magnet 62 with the at least one ferromagnetic structure 64 causes a magnetic force 44 that urges the flight control surface 20 towards a stowed position 38. For example, the flight control surface 20 may be a spoiler 26 and the adjacent structure 60 may be a flap 28. In some examples, the flight control surface 20 (e.g., the spoiler 26) comprises the at least one ferromagnetic structure 64 and the adjacent structure 60 (e.g., the flap 28) comprises the at least one magnet 62. A magnet 62 and a ferromagnetic structure 64 additionally may be referred to as a magnetic element.

Turning focus to FIG. 2 and methods 200, but with continued reference to the examples of FIG. 3, methods 200 comprise flying 202 an aircraft 10, and concurrently with the flying 202, counteracting 204 an aerodynamic lift force 42 with a magnetic force 44. More specifically, the flying 202 comprises flying the aircraft 10 at cruise, which may include flying the aircraft 10 within a range of cruising altitudes and/or within a range of cruising speeds. Examples of aircraft 10 are illustrated and discussed herein with reference to FIG. 1. Examples of cruising altitudes include at least 9000 meters (m), at least 10,000 m, at least 11,000 m, at least 12,000 m, at least 13,000 m, at most 10,000 m, at most 11,000 m, at least 12,000 m, at most 13,000 m, at most 14,000 m, at most 15,000 m, and/or at most 16,000 m. Examples of cruising speeds include at least 200 meters per second (m/s) at least 240 m/s, at least 250 m/s, at least 260 m/s, at least 270 m/s, at least 280 m/s, at least 290 m/s, at least 300 m/s, at most 250 m/s, at most 260 m/s, at most 270 m/s, at most 280 m/s, at most 290 m/s, at most 300 m/s, and/or at most 350 m/s of ground speed. Additionally or alternatively, cruising speeds may be defined in terms of a Mach number. For example, typical cruise speeds of commercial jetliners are in the range of 0.7-0.9 Mach.

The flying 202 results in an aerodynamic lift force 42 on a flight control surface 20 of the aircraft 10 that urges the flight control surface 20 away from a stowed position 38. Accordingly, the flying 202 may include positioning the flight control surface 20 in the stowed position 38. In some examples, the aerodynamic lift force 42 urges the flight control surface 20 towards a deployed position 40. For sake of illustration, the flight control surface 20 is illustrated in dot-dash lines in the deployed position 40 and is illustrated in solid lines in the stowed position 38. The flight control surface 20 is included in an aerodynamic assembly of the aircraft 10, such as a wing 12 or a tail 14 of the aircraft 10. For example, the flight control surface 20 may be a spoiler 26 of a wing 12 of the aircraft 10. In some examples, the spoiler 26 is positioned forward of a flap 28 of the wing 12. In some such examples, in the stowed position 38, a trailing edge region 46 of the spoiler 26 is in direct engagement with an upper surface 48 of a flap 28 of the wing 12. In some such examples, the aerodynamic lift force 42 urges the spoiler 26 to pivot away from the flap 28 and/or urges the trailing edge region 46 of the spoiler 26 to pivot away from direct engagement with the upper surface 48 of the flap 28. However, as noted, flight control systems 300 may be embodied with other examples of flight control surfaces 20.

Concurrently with the flying 202 the aircraft 10 at cruise, methods 200 comprise counteracting 204 the aerodynamic lift force 42 with a magnetic force 44. More specifically, the magnetic force 44 urges the flight control surface 20 towards the stowed position 38 and results in the flight control surface 20 being maintained in the stowed position 38 during the flying 202 the aircraft 10 at cruise. In other words, the counteracting 204 may include preventing upward float of the flight control surface 20 during the flying 202 the aircraft 10 at cruise. The counteracting 204 may include utilizing a magnetic hold down assembly 100 to generate the magnetic force 44. Specifically, the counteracting 204 may include producing the magnetic force 44 between at least one magnet 62 of the magnetic hold down assembly 100 and at least one ferromagnetic structure 64 of the magnetic hold down assembly 100. For example, each magnet 62 may be or include a permanent magnet that possesses an intrinsic or effectively permanent magnetic field. Examples of permanent magnets include magnetite, ferrites, rare-earth magnets, neodymium-based magnets, NdFeB magnets, samarium-based magnets, SmCo magnets, and/or alnico magnets. Additionally or alternatively, each magnet 62 may include an electromagnet that is configured to produce a magnetic field responsive to electrical current being provided therethrough. Thus, for some examples in which magnet(s) 62 comprise electromagnets, the counteracting 204 comprises providing electrical current to the magnet(s) 62, which results in each magnet 62 producing a respective magnetic field.

Ferromagnetic structure(s) 64 are configured interact with the magnetic field of magnet(s) 62 to produce the magnetic force 44 therebetween. In some examples, the ferromagnetic structure(s) 64 comprise soft magnets that magnetize in the presence of the magnetic field(s) of the magnet(s) 62 to produce a magnetic force 44 therebetween. Examples of soft magnets include annealed iron, certain iron alloys, and steel. In such examples, the counteracting 204 comprises magnetizing the ferromagnetic structure(s) 64 utilizing the magnetic field(s) of the magnet(s) 62. Additionally or alternatively, in some examples, ferromagnetic structure(s) 64 include permanent magnets. In some such examples, the counteracting 204 comprises interacting the permanent magnetic fields of the ferromagnetic structure(s) 64 with the magnetic fields of the magnet(s) 62 to produce the magnetic force(s) 44 therebetween.

In some examples, the flight control surface 20 is configured to be actuated between the stowed position 38 and the deployed position 40 by an actuator 50. In other words, in some examples, the aerodynamic assembly comprises an actuator 50 that is configured to selectively actuate the flight control surface 20 between the stowed position 38 and the deployed position 40. The actuator 50 may be any suitable type of actuator. As examples, the actuator 50 may be a mechanical actuator, a pneumatic actuator, and/or a hydraulic actuator. In some examples, the actuator 50 comprises a linear actuator having a mounted end that is attached to at least one support structure 22 of the aerodynamic assembly and an opposed end that is attached to the flight control surface 20 and that is configured to actuate the flight control surface 20 between the stowed position 38 and the deployed position 40 by moving the opposed end relative to the mounted end. In other examples, the actuator 50 comprises a rotary actuator having a mounted portion that is attached to at least one support structure 22 of the aerodynamic assembly and a rotary portion that is operatively attached to the flight control surface 20 and that is configured to rotate the rotary portion relative to the mounted portion to actuate the flight control surface 20 between the stowed position 38 and the deployed position 40. As a more specific example, the rotary actuator may be attached to the flight control surface 20, such as the spoiler 26, along a leading region 72 of the flight control surface 20 or the spoiler 26. More specifically, the flight control surface 20 may include a leading edge region 70 that is opposed to and spaced apart from the trailing edge region 46 along a chord of the flight control surface 20. Herein, the leading region 72 of the flight control surface 20 includes positions along the flight control surface 20 that are closer to the leading edge region 70 than to the trailing edge region 46.

In some examples, the counteracting 204 restricts impartation of a load on the actuator resulting from the aerodynamic lift force 42. More specifically, the actuator 50 may include a stowed configuration corresponding to the stowed position 38 of the flight control surface 20 and a deployed configuration corresponding to the deployed position 40 of the flight control surface 20. The actuator 50 may be configured to selectively transition between the stowed configuration and the deployed configuration to actuate the flight control surface 20 between the stowed position 38 and the deployed position 40. In some examples, absent the counteracting 204, the aerodynamic lift force 42 on the flight control surface 20 causes the flight control surface 20 to apply a corresponding load to the actuator 50 that urges the actuator 50 to transition towards the deployed configuration from the stowed configuration. Accordingly, in some examples, the counteracting 204 comprises reducing or even eliminating the load applied to the actuator 50 by the flight control surface 20 in response to the aerodynamic lift force 42. Stated in slightly different terms, the magnetic force 44 produced by the magnetic hold down assembly 100 may at least partially offset the aerodynamic lift force 42 and/or prevent the flight control surface 20 from transferring at least some of the aerodynamic lift force 42 to the actuator 50. Thus, the magnetic force 44 may operably restrict the actuator 50 from transitioning towards the deployed configuration as a result of the aerodynamic lift force 42 being applied to the flight control surface 20. For this reason, flight control systems 300 according to the present disclosure are well suited for utilizing hydraulic actuators, and in particular rotary hydraulic actuators 90.

That is, in some examples, the counteracting 204 extends a serviceable life of the actuator 50 due to the counteraction of the aerodynamic lift force 42 and thus the reduced fatigue on the actuator 50. More specifically, the serviceable life of the actuator 50 refers to a time period before which components of the actuator 50 need to be replaced or otherwise are out of spec as a result of normal or operational wear. As mentioned, the counteracting 204 may reduce loads applied to components of the actuator 50 at least during the flying 202 the aircraft 10 at cruise and thereby may reduce persistent or chronic wear on these components. As a more specific example, the actuator 50 may be a hydraulic actuator 68 that comprises at least one internal seal 52 that is configured to restrict flow of hydraulic fluid 54 between hydraulic chambers of the hydraulic actuator 68. The hydraulic chambers may be separated from one another by a piston (e.g., when the hydraulic actuator 68 is a linear hydraulic actuator) or a rotary vane (e.g., when the hydraulic actuator 68 is a rotary hydraulic actuator) that is operably connected to the flight control surface 20. In some examples, absent the counteracting 204, the aerodynamic lift force 42 causes the flight control surface 20 to apply force to the piston or torque to the rotary vane of the hydraulic actuator 68 that creates a pressure differential across the hydraulic chambers. In some examples, this pressure differential stresses the at least one internal seal 52. In some examples, the stress on the at least one internal seal 52 causes strain on the at least one internal seal 52, which may reduce its serviceable life, and thereby the serviceable life of the hydraulic actuator 68. Accordingly, the counteracting 204 may include reducing a pressure differential between hydraulic chambers of the hydraulic actuator 68. The counteracting 204 also may include reducing stress on or strain of the at least one internal seal 52 of the hydraulic actuator 68, which may increase the serviceable life of the hydraulic actuator 68. Stated differently, in some examples, fluid movement within a hydraulic actuator 68, when a flight control surface 20 experiences an aerodynamic lift force 42, urges the flight control surface 20 in the stowed position 38 toward the deployed position with a reactive force, and wherein the magnetic force 44 is calibrated to counteract said reactive force.

In some examples, the counteracting 204 prevents flow of hydraulic fluid 54 across the at least one internal seal 52. More specifically, the at least one internal seal 52 of the hydraulic actuator 68 may provide an imperfect seal of hydraulic fluid 54 between the hydraulic chambers. In other words, the internal seal 52 may discourage but may not completely eliminate flow of hydraulic fluid 54 between the hydraulic chambers. In some examples, absent the counteracting 204, the aerodynamic lift force 42 would cause the flight control surface 20 to move away from the stowed position 38 as a result of the imperfect seal. In particular, the imperfect seal may allow hydraulic fluid 54 to flow between the hydraulic chambers under the pressure differential created by action of the flight control surface 20 on the piston or rotary vane of the hydraulic actuator absent the counteracting 204, and the flow of hydraulic fluid 54 within the hydraulic actuator 68 may allow the hydraulic actuator 68 to transition towards the deployed configuration. As such, the counteracting 204 may prevent flow of hydraulic fluid 54 across the at least one internal seal 52 by offsetting or at least partially relieving a load applied to the hydraulic actuator 68 by the flight control surface 20 as a result of the aerodynamic lift force 42.

In some examples, the flying 202 the aircraft 10 at cruise would include, in the absence of the counteracting 204, balancing, with the actuator 50, a load applied to the actuator 50 by the flight control surface 20 as a result of the aerodynamic lift force 42. The balancing may include actuating the actuator 50, which may include pressurizing one or more hydraulic chambers with hydraulic fluid 54 for examples in which the actuator 50 is a hydraulic actuator 68. As the counteracting 204 includes relieving at least a portion of this load from the actuator 50, in some examples, the actuator 50 is not in a state of actuation during the flying 202 the aircraft at cruise.

The counteracting 204 may include balancing, offsetting, or relieving a portion of or the entirety of the aerodynamic lift force 42. In other words, the counteracting 204 may include preventing a portion of or the entirety of the aerodynamic lift force 42 from being transferred to the actuator 50. With this in mind, the magnetic hold down assembly 100 may be configured such that the magnetic force 44 is at least 50% of the aerodynamic lift force 42, at least 100% of the aerodynamic lift force 42, and/or 100-200% of the aerodynamic lift force 42. More specific examples of the aerodynamic lift force 42 include at least 500 newton (N), at least 1,000 N, at least 2,000 N, at least 3,000 N, at least 4,000 N, at most 5,000 N, and/or 500-5,000 N.

For examples in which the counteracting 204 comprises offsetting a portion of the aerodynamic lift force 42 or the magnetic force is less than 100% of the aerodynamic lift force 42, the actuator 50 may accept and/or counter at least some of the aerodynamic lift force 42 that is not offset by the counteracting 204 such that the magnetic hold down assembly 100 together with the actuator 50 may retain the flight control surface 20 in the stowed position 38 during the counteracting 204. That said, even in such examples, the counteracting 204 comprises reducing a load on the actuator 50 resulting from the aerodynamic lift force 42 relative to the load that otherwise would applied to the actuator 50 absent the counteracting 204, and this may increase the serviceable lifetime of the actuator 50 and/or reduce the likelihood of the flight control surface 20 pivoting toward the deployed position 40 under the aerodynamic lift force 42.

The magnetic force 44 produced by the magnetic hold down assembly 100 varies with respect to a separation between the magnet(s) 62 and the ferromagnetic structure(s) 64 when the flight control surface 20 is in the stowed position 38. With this in mind, in some examples, the magnet(s) 62 and the ferromagnetic structure(s) 64 are disposed on the flight control surface 20 and the adjacent structure 60 to be within a threshold separation of one another when the flight control surface 20 is in the stowed position 38. In other words, the magnet(s) 62 may be positioned at the threshold separation from the ferromagnetic structure(s) 64 during the counteracting 402. Examples of the threshold separation include at most 0.5 millimeters (mm), at most 1 mm, at most 1.5 mm, at most 2 mm, at most 2.5 mm, at most 3 mm, at most 4 mm, at most 5 mm, and/or at most 10 mm. As a more specific example, when the flight control surface 20 is a spoiler 26 and the adjacent structure is a flap 28, the at least one magnet 62 may be positioned beneath an upper surface 48 of the flap 28 and the at least one ferromagnetic structure may be positioned within the trailing edge region 46 of the spoiler 26. In some examples, and in order to at least partially offset the aerodynamic lift force 42, the magnet(s) 62 may be configured to exert a threshold net pull force at the threshold separation. In other words, the magnet(s) 62 may exert the net pull force on the ferromagnetic structure(s) 64 during the counteracting 402. As more specific examples, with a threshold separation of 2.5 millimeters, the magnet(s) 62 may have a net pull force of at least 500 N, at least 1,000 N, at least 2,000 N, at least 3,000 N, at least 4,000 N, at most 5,000 N, and/or 500-5,000 N.

In some examples, the at least one magnet 62 includes a plurality of spaced-apart magnets 62 that collectively produce the net pull force. As examples, the magnetic hold down assembly 100 may include at least 2, at least 3, at least 4, at least 5, at least 6, most 3, at most 5, at most 6, at most 8, and/or at most 10 spaced-apart magnets 62. For examples in which the flight control surface 20 is a spoiler 26 and the adjacent structure 60 is a flap 28, the plurality of spaced apart magnets 62 are distributed along a span of the flap 28 and positioned beneath an upper surface 48 of the flap 28. In some examples, the at least one ferromagnetic structure 64 comprises a plurality of spaced apart ferromagnetic structures 64 corresponding to the plurality of spaced apart magnets 62 and that respectively are positioned to interact with the plurality of spaced apart magnets 62. In such examples, the plurality of ferromagnetic structures 64 interact with the plurality of magnets 62 during the counteracting 204. In some examples, the plurality of ferromagnetic structures 64 are distributed along a span of the trailing edge region 46 of the spoiler 26. Alternatively, in some examples, the at least one ferromagnetic structure 64 includes a single ferromagnetic structure 64 that is positioned to interact with each of the plurality of spaced apart magnets 62, such that the single ferromagnetic structure 64 interacts with the plurality of spaced apart magnets 62 during the counteracting 402. As a more specific example, the single ferromagnetic structure 64 may include a steel plate 66 that extends along a span of the trailing edge region 46 of the spoiler 26.

Figure 4:
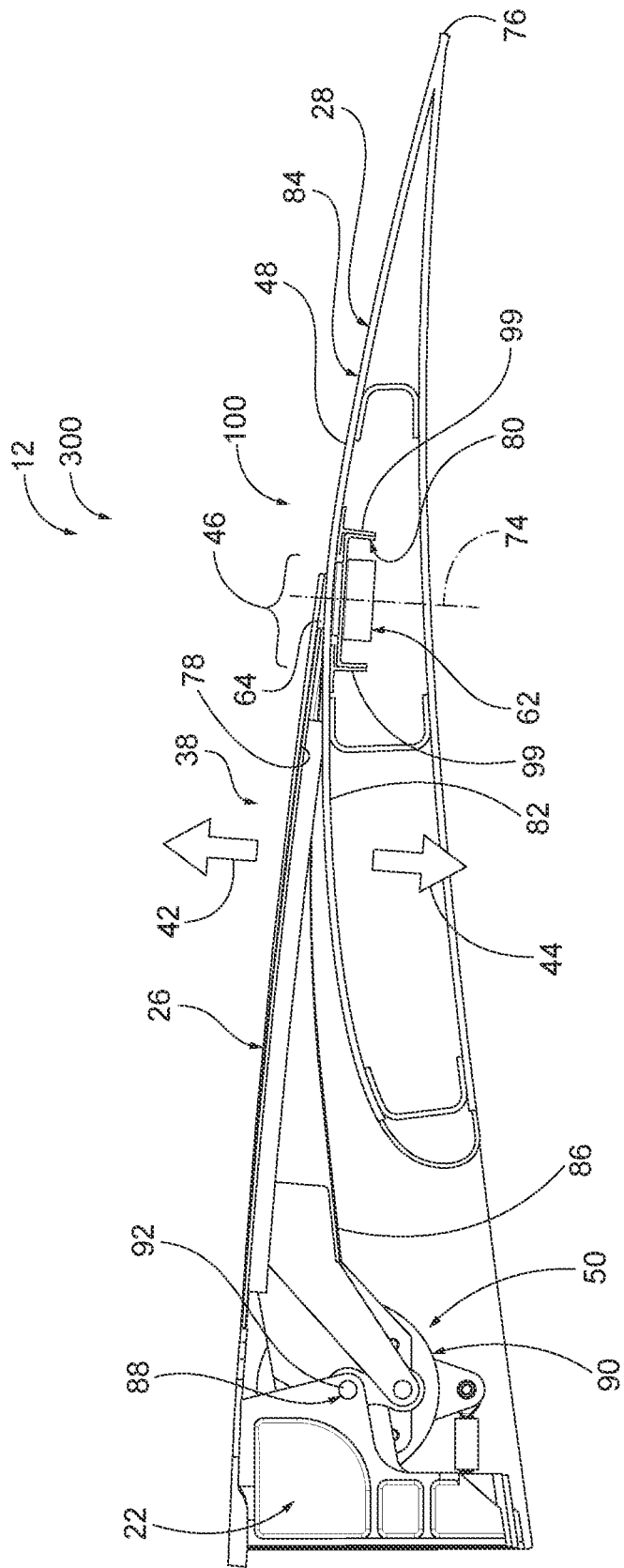
FIG. 4 is a cross-sectional view of a portion of an example wing according to the present disclosure.
Figure 5:
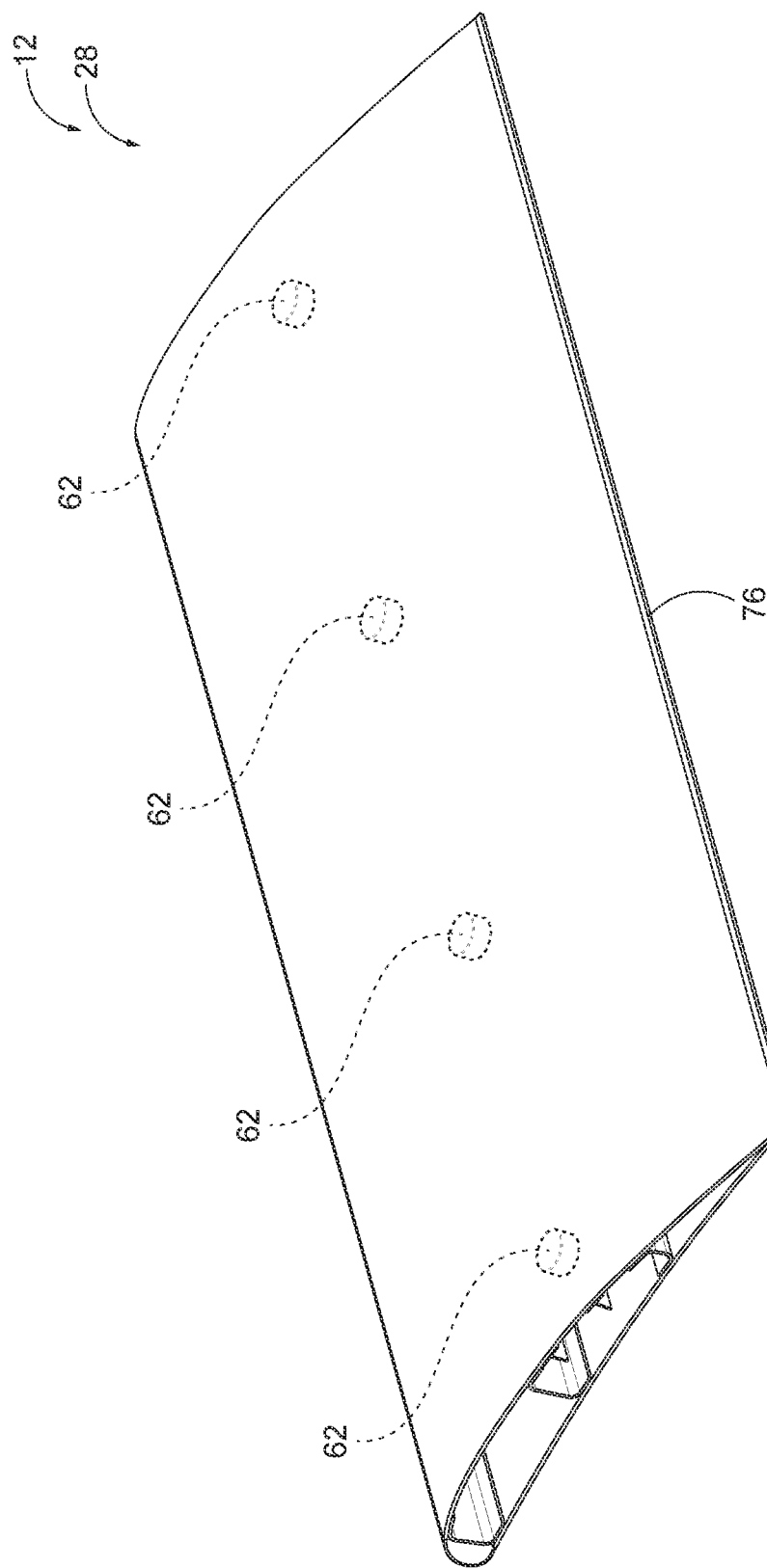
FIG. 5 is an isometric view of an example flap of the example wing of FIG. 4 according to the present disclosure.
Figure 6:
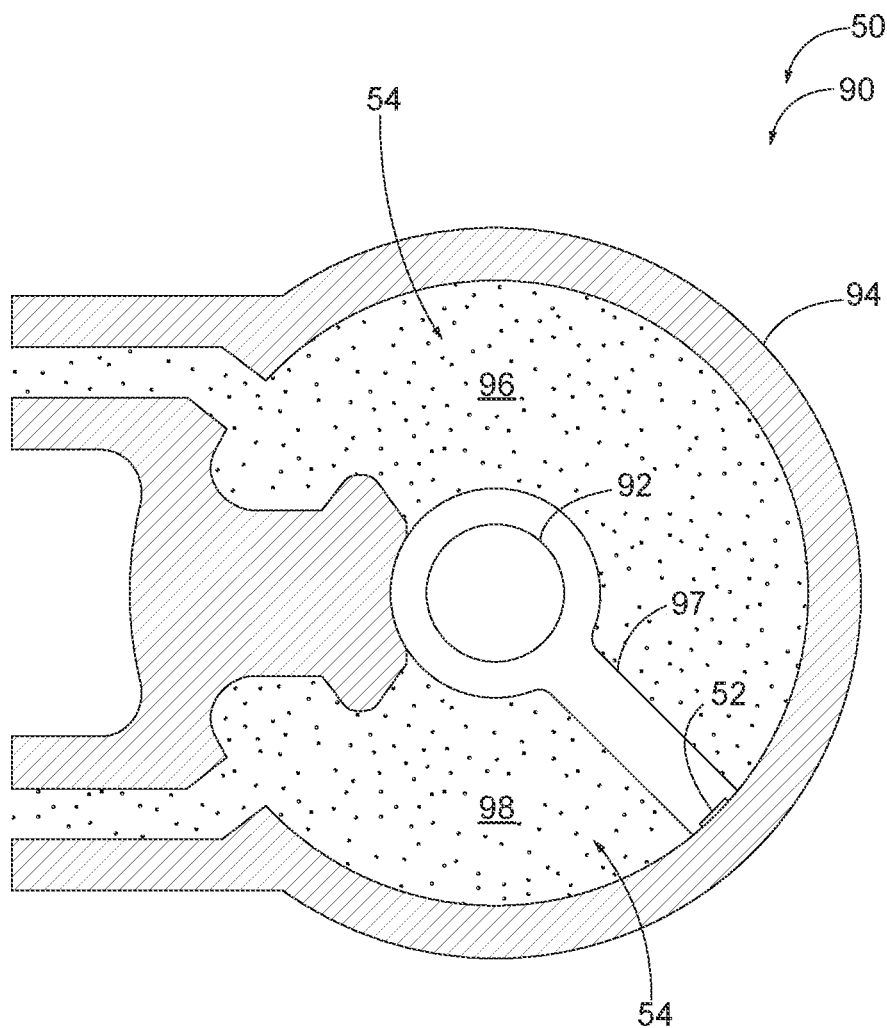
FIG. 6 is a cross-sectional view illustrating an example rotary hydraulic actuator of the example wing of FIG. 4 according to the present disclosure.

Turning now to FIGS. 4-6, illustrative non-exclusive examples of wings 12 comprising magnetic hold down assemblies 100 are illustrated. Where appropriate, the reference numerals from the schematic illustrations of FIGS. 1 and 3 are used to designate corresponding parts of in FIGS. 4-6; however, the examples of FIGS. 4-6 are non-exclusive and do not limit wings 12 or magnetic hold down assemblies 100 to the illustrated embodiments of FIGS. 4-6. That is, wings 12 and/or hold down assemblies 100 may incorporate any number of the various aspects, configurations, characteristics, properties, etc. that are illustrated in and discussed with reference to the schematic representations of FIGS. 1-3 and/or the embodiments of FIGS. 4-6, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 4-6; however, it is within the scope of the present disclosure that the previously discussed features, variants, etc. may be utilized with the examples of FIGS. 4-6. Likewise, each step or portion of methods 200 may be performed utilizing the examples of wings 12 and magnetic hold down assemblies 100 that are illustrated and discussed herein in connection to FIGS. 4-6.

FIG. 4 is a cross-sectional view showing a portion of an example wing 12, FIG. 5 is a perspective view of a flap 28 of the example wing 12 of FIG. 4, and FIG. 6 is a cross-sectional view of an actuator 50 of the example wing 12 of FIG. 4. With initial reference to FIGS. 4 and 5, the wing 12 includes a spoiler 26 and a flap 28 that defines a trailing edge 76 of the wing 12. The spoiler 26 is positioned forward of the flap 28 with a trailing edge region 46 of the spoiler 26 being positioned adjacent to a half chord line 74 of the flap 28. In FIG. 4, the spoiler 26 is in the stowed position 38 such that the trailing edge region 46 of the spoiler 26 is positioned directly adjacent to, and optionally abuts, an upper surface 48 of the flap 28.

The wing 12 further comprises a magnetic hold down assembly 100. Specifically, the magnetic hold down assembly 100 includes a single ferromagnetic structure 64 that is mounted to an underside 78 of the trailing edge region 46 of the spoiler 26 and that extends along a span of the trailing edge region 46. The magnetic hold down assembly 100 further comprises a plurality of magnets 62 mounted on the flap 28 adjacent or along the half chord line 74 of the flap 28. Specifically, the flap 28 includes a plurality of brackets 80 that are attached to stringers 99 of the flap 28 and that are positioned beneath an underside 82 of the upper skin 84 of the flap 28. The brackets 80 support the magnets 62 such that each magnet 62 is positioned beneath the upper surface 48 of the flap 28. Each magnet 62 is positioned to interact with the ferromagnetic structure 64 at least when the spoiler 26 is in the stowed position 38 and produce a magnetic force 44 by interaction with the ferromagnetic structure 64.

The spoiler 26 further includes an arm 86 that extends from the underside 78 of the spoiler 26 and that projects forward of the spoiler 26 to attach the spoiler 26 with a pivot mount 88. The pivot mount 88 is comprised in a support structure 22 of the wing 12 and the spoiler 26 is configured to pivot about the pivot mount 88 between the stowed position 38 and the deployed position 40. The wing 12 further includes an actuator 50 that also is attached to the support structure 22 and that is configured to pivot the spoiler 26 between the stowed position 38 and the deployed position 40. Specifically, the actuator 50 is a rotary hydraulic actuator 90 that is configured to selectively rotate the arm 86 about the pivot mount 88 to pivot the spoiler 26 between the stowed position 38 and the deployed position 40. The rotary hydraulic actuator 90 includes an axle 92 that is coupled to the arm 86 of the spoiler 26 and that is configured to rotate the arm 86 about the pivot mount 88. As shown in FIG. 4, the aerodynamic lift force 42 applies a torque to the spoiler 26 that urges the spoiler 26 to pivot towards the deployed position, which urges the arm 86 to rotate in a counterclockwise direction about the pivot mount 88. This torque is balanced by the magnetic force 44 between the magnets 62 and the ferromagnetic structure 64 such that the spoiler 26 is maintained in the stowed position 38 as a result of the magnetic hold down assembly 100. However, in the absence of the magnetic hold down assembly 100, the arm 86 of the spoiler 26 would apply this torque to the axle 92 of the rotary hydraulic actuator 90.

More specifically, turning to FIG. 6 but with continued reference to FIGS. 4-5, the rotary hydraulic actuator 90 includes a housing 94 that is secured to the support structure 22 of the wing 12. A plurality of hydraulic chambers are defined within the housing 94 and are separated from one another by a rotary vane 97 and an associated internal seal 52. Specifically, the plurality of hydraulic chambers include an extend chamber 96 and a retract chamber 98, and each hydraulic chamber is filled with hydraulic fluid 54. The rotary vane 97 is rotatably mounted within the housing 94 with the associated internal seal 52 sealing against an interior surface of the housing 94.

The rotary vane 97 is coaxially coupled to or integral with the axle 92 and is configured to rotate the axle 92 responsive to pressurization of the extend chamber 96 with respect to the retract chamber 98 or vice versa. In other words, the rotary vane 97 is configured to pivot the axle 92 and thus the spoiler 26 towards the deployed position responsive to pressurization of the extend chamber 96, and the rotary vane 97 is configured to pivot the spoiler 26 towards the stowed position 38 responsive to pressurization of the retract chamber 98. As discussed, in the absence of the magnetic hold down assembly 100, the aerodynamic lift force 42 on the spoiler 26 causes the arm 86 of the spoiler 26 to apply torque to the axle 92. This torque urges the rotary vane 97 to rotate within the housing 94, which results in pressurization of the hydraulic fluid 54 within the retract chamber 98 relative to the hydraulic fluid 54 within the extend chamber 96. The pressure differential between the extend chamber 96 and the retract chamber 98 that is created by the torque on the rotary vane 97 places stress on the internal seal 52 and may result in leakage of the hydraulic fluid 54 from the retract chamber 98 to the extend chamber 96. Unless the rotary hydraulic actuator 90 is constantly powered to maintain equilibrium between the extend chamber 96 and the retract chamber 98, this leakage of hydraulic fluid 54 will result in the spoiler 26 pivoting towards the deployed position under the aerodynamic lift force 42. As such, the magnetic force 44 produced by the magnetic hold down assembly 100 is operable to restrict aerodynamic lift force-induced movement of the rotary vane 97 within the rotary hydraulic actuator 90. Accordingly, the magnetic force 44 produced by the magnetic hold down assembly 100 is operable to restrict aerodynamic lift force-induced pressurization of hydraulic fluid 54 within the hydraulic chambers, thereby reducing stress on the internal seal 52 of the rotary hydraulic actuator 90 and/or reducing the power that otherwise would need to be supplied to the rotary hydraulic actuator 90 to maintain the spoiler 26 in the stowed position 38 under the aerodynamic lift force 42.

Illustrative, non-exclusive examples of inventive subject matter according to the present disclosure are described in the following enumerated paragraphs:

A. A method (200), comprising:

flying (202) an aircraft (10) at cruise, wherein the flying (202) results in an aerodynamic lift force (42) on a flight control surface (20) of the aircraft (10), and wherein the aerodynamic lift force (42) urges the flight control surface (20) away from a stowed position (38); and concurrently with the flying (202) the aircraft (10) at cruise, counteracting (204) the aerodynamic lift force (42) with a magnetic force (44), and wherein the magnetic force (44) urges the flight control surface (20) towards the stowed position (38), wherein the counteracting (204) results in the flight control surface (20) being maintained in the stowed position (38) during the flying (202) the aircraft (10) at cruise.

A1. The method (200) of paragraph A, wherein the flight control surface (20) is a spoiler (26).

A1.1. The method (200) of paragraph A1, wherein in the stowed position (38), a trailing edge region (46) of the spoiler (26) is in direct engagement with an upper surface (48) of a flap (28).

A2. The method (200) of any of paragraphs A-A1.1, wherein the flight control surface (20) is configured to be actuated between the stowed position (38) and a deployed position (40) by an actuator (50).

A2.1. The method (200) of paragraph A2, wherein the counteracting (204) restricts impartation of a load on the actuator (50) resulting from the aerodynamic lift force (42).

A2.2. The method (200) of any of paragraphs A2-A2.1, wherein the counteracting (204) extends a serviceable life of the actuator (50).

A2.3. The method (200) of any of paragraphs A2-A2.2, wherein the actuator (50) is a hydraulic actuator (68) and comprises an internal seal (52), and wherein the counteracting (204) prevents flow of hydraulic fluid (54) across the internal seal (52).

A2.3.1 The method (200) of any of paragraphs A2-A2.3, wherein the actuator (50) is a/the hydraulic actuator (68) and wherein the counteracting (204) prevents pressurization of hydraulic fluid within the hydraulic actuator that otherwise would result from the aerodynamic lift force (42).

A2.4. The method (200) of any of paragraphs A2-A2.3.1, wherein the actuator (50) is a/the hydraulic actuator (68) and comprises an/the internal seal (52), and wherein during the method (200), the internal seal (52) provides an imperfect seal of hydraulic fluid (54).

A2.4.1. The method (200) of paragraph A2.4, wherein absent the counteracting (204), the aerodynamic lift force (42) would cause the flight control surface (20) to move away from the stowed position (38) as a result of the imperfect seal of the hydraulic fluid (54).

A2.5. The method (200) of any of paragraphs A2-A2.4.1, wherein the actuator (50) is a rotary actuator.

A2.5.1 The method (200) of paragraph A2.5, wherein the rotary actuator is a rotary hydraulic actuator (90).

A2.6. The method (200) of any of paragraphs A2-A2.4.1, wherein the actuator (50) is a linear actuator.

A2.7. The method (200) of any of paragraphs A2-A2.6, wherein the actuator (50) is not in a state of actuation during the flying (202) the aircraft (10) at cruise.

A3. The method (200) of any of paragraphs A-A2.7, wherein one of the flight control surface (20) or an adjacent structure (60) of a wing (12) comprises at least one magnet (62) and the other of the flight control surface (20) or the adjacent structure (60) of the wing (12) comprises at least one ferromagnetic structure (64), and wherein an interaction of a magnetic field of the at least one magnet (62) with the at least one ferromagnetic structure (64) causes the magnetic force (44).

A3.1. The method (200) of paragraph A3, wherein the at least one ferromagnetic structure (64) comprises a steel plate (66).

A3.2. The method (200) of any of paragraphs A3-A3.1, wherein the at least one magnet (62) is a permanent magnet.

A3.3. The method (200) of any of paragraphs A3-A3.2, wherein the at least one magnet (62) is an electromagnet.

A3.4. The method (200) of any of paragraphs A3-A3.3 when depending from paragraph A1.1, wherein the spoiler (26) comprises the at least one ferromagnetic structure (64), and wherein the at least one ferromagnetic structure (64) is positioned within the trailing edge region (46) of the spoiler (26).

A3.4.1. The method (200) of paragraph A3.4, wherein the at least one magnet (62) is positioned beneath the upper surface (48) of the flap (28).

A3.5. The method (200) of any of paragraphs A3-A3.4.1, wherein the at least one magnet (62) comprises a plurality of spaced-apart magnets (62).

A3.5.1. The method (200) of paragraph A3.5, wherein the at least one ferromagnetic structure (64) is a single ferromagnetic structure (64) that interacts with each magnet (62) of the plurality of spaced-apart magnets (62) during the counteracting (204).

A3.5.2. The method (200) of paragraph A3.5, wherein the at least one ferromagnetic structure (64) comprises a plurality of spaced-apart ferromagnetic structures (64) corresponding to respective ones of the plurality of spaced-apart magnets (62).

A4. The method (200) of any of paragraphs A-A3.5.2, wherein the aerodynamic lift force (42) is 500-5,000 newton.

A5. The method (200) of any of paragraphs A-A4, wherein the magnetic force (44) is equal to or greater than the aerodynamic lift force (42).

A5.1. The method (200) of any of paragraphs A-A4, wherein the magnetic force (44) is 100-200% of the aerodynamic lift force (42).

A6. The method (200) of any of paragraphs A-A4, wherein the magnetic force (44) is at least 50% of the aerodynamic lift force (42).

A7. The method (200) of any of paragraphs A-A6, wherein the at least one magnet (62) has a pull force at 2.5 millimeters of 500-5,000 newton.

A8. The method (200) of any of paragraphs A-A6, wherein the aircraft (10) comprises the flight control system (300) of any of paragraphs B-B8.2.1.

B. A flight control system (300), comprising:
a flight control surface (20); and
an adjacent structure (60) adjacent to the flight control surface (20);
wherein one of the flight control surface (20) or the adjacent structure (60) comprises at least one magnet (62) and the other of the flight control surface (20) or the adjacent structure (60) comprises at least one ferromagnetic structure (64), and wherein an interaction of a magnetic field of the at least one magnet (62) with the at least one ferromagnetic structure (64) causes a magnetic force (44) that urges the flight control surface (20) toward a stowed position (38).

B1. The flight control system (300) of paragraph B, wherein the flight control surface (20) is a spoiler (26) and the adjacent structure (60) is a flap (28).

B1.1. The flight control system (300) of paragraph B1, wherein the spoiler (26) comprises a trailing edge region (46), wherein the flap (28) comprises an upper surface (48), wherein the spoiler (26) is configured to be pivoted between the stowed position (38) and a deployed position (40), wherein in the stowed position (38), the trailing edge region (46) of the spoiler (26) is in direct engagement with the upper surface (48) of the flap (28), and wherein in the deployed position (40), the trailing edge region (46) of the spoiler (26) is pivoted and spaced away from the upper surface (48) of the flap (28).

B2. The flight control system (300) of any of paragraphs B-B1.1, wherein the at least one ferromagnetic structure (64) comprises a steel plate (66).

B3. The flight control system (300) of any of paragraphs B-B2, wherein the at least one magnet (62) is a permanent magnet.

B4. The flight control system (300) of any of paragraphs B-B2, wherein the at least one magnet (62) is an electromagnet.

B5. The flight control system (300) of any of paragraphs B-B4 when depending from paragraph B1.1, wherein the spoiler (26) comprises the at least one ferromagnetic structure (64), and wherein the at least one ferromagnetic structure (64) is positioned within the trailing edge region (46) of the spoiler (26).

B5.1. The flight control system (300) of paragraph B5, wherein the at least one magnet (62) is positioned beneath the upper surface (48) of the flap (28).

B6. The flight control system (300) of any of paragraphs B-B5.1, wherein the at least one magnet (62) comprises a plurality of spaced-apart magnets (62).

B6.1. The flight control system (300) of paragraph B6, wherein the at least one ferromagnetic structure (64) is a single ferromagnetic structure (64) positioned to interact with each magnet (62) of the plurality of spaced-apart magnets (62).

B6.2. The flight control system (300) of paragraph B6, wherein the at least one ferromagnetic structure (64) comprises a plurality of spaced-apart ferromagnetic structures (64) corresponding to respective ones of the plurality of spaced-apart magnets (62).

B7. The flight control system (300) of any of paragraphs B-B6.2, wherein the at least one magnet (62) has a pull force at 2.5 millimeters of 500-5,000 newton.

B8. The flight control system (300) of any of paragraphs B-B7, further comprising an actuator (50) that is configured to selectively pivot the flight control surface (20) between the stowed position (38) and a/the deployed position (40).

B8.1 The flight control system (300) of paragraph B8, wherein the actuator (50) comprises a deployed configuration corresponding to the deployed position (40) of the flight control surface (20) and a stowed configuration corresponding to the stowed position (38) of the flight control surface (20), wherein the actuator (50) is configured to selectively transition between the stowed configuration and the deployed configuration to pivot the flight control surface (20) between the stowed configuration and the deployed configuration, and wherein the magnetic force (44) operably restricts the actuator (50) from transitioning from the stowed configuration towards the deployed configuration as a result of the aerodynamic lift force (42) on the flight control surface (20).

B8.2 The flight control system (300) of any of paragraphs B8-B8.1, wherein the actuator (50) is a rotary hydraulic actuator (90).

B8.2.1 The flight control system (300) of paragraph B8.2, wherein the rotary hydraulic actuator (90) comprises an extend chamber (96) and a retract chamber (98), both of which are filled with hydraulic fluid (54), wherein the rotary hydraulic actuator (90) further comprises a rotary vane (97) that separates the retract chamber (98) from the extend chamber (96), wherein the rotary vane (97) is configured to rotate jointly with the flight control surface (20), and wherein the magnetic force (44) is operable to restrict movement of the rotary vane (97) within the rotary hydraulic actuator (90) as a result of the aerodynamic lift force (42) on the flight control surface (20).

C. A flight control system (300), comprising:
- a flight control surface (20) that includes a first magnetic element (62, 64);
- a structure (60) adjacent to the flight control surface (20) and including a second magnetic element (62, 64) that is attracted to the first magnetic element (62, 64) by a magnetic force (44); and a rotary hydraulic actuator (90) operably linked to and configured to selectively pivot the flight control surface (20) between a stowed position (38) and a deployed position (40);
- wherein fluid movement within the rotary hydraulic actuator (90), when the flight control surface (20) experiences an aerodynamic load, urges the flight control surface (20) in the stowed position (38) toward the deployed position (40) with a reactive force; and
- wherein the magnetic force (44) is calibrated to counteract said reactive force.

C1. The flight control system (300) of paragraph C, further comprising the subject matter of any of paragraphs B-B8.2.1.

D. Use of one or more magnets (62) and one or more ferromagnetic structures (64) to prevent upward float of a flight control surface (20) during cruise of an aircraft (10).

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase, "for example," the phrase, "as an example," the phrase "in some examples," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method (200), comprising:
   flying (202) an aircraft (10) at cruise, wherein the flying (202) results in an aerodynamic lift force (42) on a flight control surface (20) of the aircraft (10), and wherein the aerodynamic lift force (42) urges the flight control surface (20) away from a stowed position (38); and
   concurrently with the flying (202) the aircraft (10) at cruise, counteracting (204) the aerodynamic lift force (42) with a magnetic force (44), and wherein the magnetic force (44) urges the flight control surface (20) towards the stowed position (38), wherein the counteracting (204) results in the flight control surface (20) being maintained in the stowed position (38) during the flying (202) the aircraft (10) at cruise;
   wherein the flight control surface (20) is configured to be actuated between the stowed position (38) and a deployed position (40) by an actuator (50).

2. The method (200) of claim 1, wherein the flight control surface (20) is a spoiler (26).

3. The method (200) of claim 2, wherein in the stowed position (38), a trailing edge region (46) of the spoiler (26) is in direct engagement with an upper surface (48) of a flap (28).

4. The method (200) of claim 1, wherein the counteracting (204) restricts impartation of a load on the actuator (50) resulting from the aerodynamic lift force (42).

5. The method (200) of claim 1, wherein the counteracting (204) extends a serviceable life of the actuator (50).

6. The method (200) of claim 1, wherein the actuator (50) is a hydraulic actuator (68) and comprises an internal seal (52), and wherein the counteracting (204) prevents flow of hydraulic fluid (54) across the internal seal (52).

7. The method (200) of claim 1, wherein the actuator (50) is a hydraulic actuator (68), and wherein the counteracting (204) prevents pressurization of hydraulic fluid (54) within the hydraulic actuator (68) that otherwise would result from the aerodynamic lift force (42).

8. The method (200) of claim 1, wherein the actuator (50) is a hydraulic actuator (68) and comprises an internal seal (52), wherein during the method (200), the internal seal (52) provides an imperfect seal of hydraulic fluid (54), and wherein absent the counteracting (204), the aerodynamic lift force (42) would cause the flight control surface (20) to move away from the stowed position (38) as a result of the imperfect seal of the hydraulic fluid (54).

9. The method (200) of claim 1, wherein the actuator is a rotary hydraulic actuator (90), and wherein the flight control surface (20) is a spoiler (26).

10. The method (200) of claim 1, wherein the actuator (50) is not in a state of actuation during the flying (202) the aircraft (10) at cruise.

11. The method (200) of claim 1, wherein one of the flight control surface (20) or an adjacent structure (60) of a wing (12) comprises at least one magnet (62) and the other of the flight control surface (20) or the adjacent structure (60) of the wing (12) comprises at least one ferromagnetic structure (64), and wherein an interaction of a magnetic field of the at least one magnet (62) with the at least one ferromagnetic structure (64) causes the magnetic force (44).

12. The method (200) of claim 11, wherein the flight control surface (20) is a spoiler (26), wherein in the stowed position (38), a trailing edge region (46) of the spoiler (26) is in direct engagement with an upper surface (48) of a flap (28), wherein the spoiler (26) comprises the at least one ferromagnetic structure (64), and wherein the at least one ferromagnetic structure (64) is positioned within the trailing edge region (46) of the spoiler (26).

13. The method (200) of claim 11, wherein the at least one magnet (62) has a pull force at 2.5 millimeters of 500-5,000 newton.

14. The method of claim 1, wherein the aerodynamic lift force (42) is 500-5,000 newton.

15. The method of claim 1, wherein the magnetic force (44) is equal to or greater than the aerodynamic lift force (42).

16. A flight control system (300), comprising:
   a flight control surface (20);
   an adjacent structure (60) adjacent to the flight control surface (20); and
   a rotary hydraulic actuator (90) that is configured to selectively pivot the flight control surface (20) between a stowed position (38) and a deployed position (40);
   wherein one of the flight control surface (20) or the adjacent structure (60) comprises at least one magnet (62) and the other of the flight control surface (20) or the adjacent structure (60) comprises at least one ferromagnetic structure (64), and wherein an interaction of a magnetic field of the at least one magnet (62) with the at least one ferromagnetic structure (64) causes a magnetic force (44) that urges the flight control surface (20) toward the stowed position (38); and wherein the rotary hydraulic actuator (90) comprises a deployed configuration corresponding to the deployed position (40) of the flight control surface (20) and a stowed configuration corresponding to the stowed position (38) of the flight control surface (20), wherein the rotary hydraulic actuator (90) is configured to selectively transition between the stowed configuration and the deployed configuration to pivot the flight control surface (20) between the stowed configuration and the deployed configuration, and wherein the magnetic force (44) operably restricts the rotary hydraulic actuator (90) from transitioning from the stowed configuration towards the deployed configuration as a result of aerodynamic lift force (42) on the flight control surface (20).

17. The flight control system (300) of claim 16, wherein the flight control surface (20) is a spoiler (26) and the adjacent structure (60) is a flap (28), wherein the spoiler (26) comprises a trailing edge region (46), wherein the flap (28) comprises an upper surface (48), wherein the spoiler (26) is configured to be pivoted between the stowed position (38) and the deployed position (40), wherein in the stowed position (38), the trailing edge region (46) of the spoiler (26) is in direct engagement with the upper surface (48) of the flap (28), wherein in the deployed position (40), the trailing edge region (46) of the spoiler (26) is pivoted and spaced away from the upper surface (48) of the flap (28), wherein the spoiler (26) comprises the at least one ferromagnetic structure (64), and wherein the at least one ferromagnetic structure (64) is positioned within the trailing edge region (46) of the spoiler (26).

18. The flight control system (300) of claim 16, wherein the at least one magnet (62) is positioned beneath the upper surface (48) of the flap (28).

19. The flight control system (300) of claim 16, wherein the at least one magnet (62) comprises a plurality of spaced-apart magnets (62).

20. The flight control system (300) of claim 17, wherein the rotary hydraulic actuator (90) comprises an extend chamber (96) and a retract chamber (98), both of which are filled with hydraulic fluid (54), wherein the rotary hydraulic actuator (90) further comprises a rotary vane (97) that separates the retract chamber (98) from the extend chamber (96), wherein the rotary vane (97) is configured to rotate jointly with the flight control surface (20), and wherein the magnetic force (44) is operable to restrict movement of the rotary vane (97) within the rotary hydraulic actuator (90) as a result of the aerodynamic lift force (42) on the flight control surface (20).

21. A flight control system (300), comprising:
   a flight control surface (20) that includes a first magnetic element (62, 64);
   a structure (60) adjacent to the flight control surface (20) and including a second magnetic element (62, 64) that is attracted to the first magnetic element (62, 64) by a magnetic force (44); and
   a rotary hydraulic actuator (90) operably linked to and configured to selectively pivot the flight control surface (20) between a stowed position (38) and a deployed position (40);
   wherein fluid movement within the rotary hydraulic actuator (90), when the flight control surface (20) experiences an aerodynamic lift force (42), urges the flight control surface (20) in the stowed position (38) toward the deployed position (40) with a reactive force; and
   wherein the magnetic force (44) is calibrated to counteract said reactive force.

22. The flight control system (300) of claim 21, wherein the flight control surface (20) is a spoiler (26) and the structure (60) adjacent to the flight control surface (20) is a flap (28), wherein the spoiler (26) comprises a trailing edge region (46), wherein the flap (28) comprises an upper surface (48), wherein the spoiler (26) is configured to be pivoted between the stowed position (38) and the deployed position (40), wherein in the stowed position (38), the trailing edge region (46) of the spoiler (26) is in direct engagement with the upper surface (48) of the flap (28), wherein in the deployed position (40), the trailing edge region (46) of the spoiler (26) is pivoted and spaced away from the upper surface (48) of the flap (28), and wherein the first magnetic element (62, 64) is positioned within the trailing edge region (46) of the spoiler (26).

\* \* \* \* \*

UNITED STATES PATENT AND TRADEMARK OFFICE
CERTIFICATE OF CORRECTION

PATENT NO. : 11,926,416 B1
APPLICATION NO. : 17/891013
DATED : March 12, 2024
INVENTOR(S) : Kevin Raylin Tsai Page 1 of 1

It is certified that error appears in the above-identified patent and that said Letters Patent is hereby corrected as shown below:

In the Claims

Column 17, Line 37, 'claim 16' should read --claim 17--.
Column 17, Line 40, 'claim 16' should read --claim 17--.
Column 17, Line 43, 'claim 17' should read --claim 16--.

Signed and Sealed this
Thirtieth Day of July, 2024

Katherine Kelly Vidal
*Director of the United States Patent and Trademark Office*